Jan. 5, 1932.   P. F. PEW   1,839,993
OPERATION INDICATOR
Filed Dec. 26, 1930   2 Sheets-Sheet 1
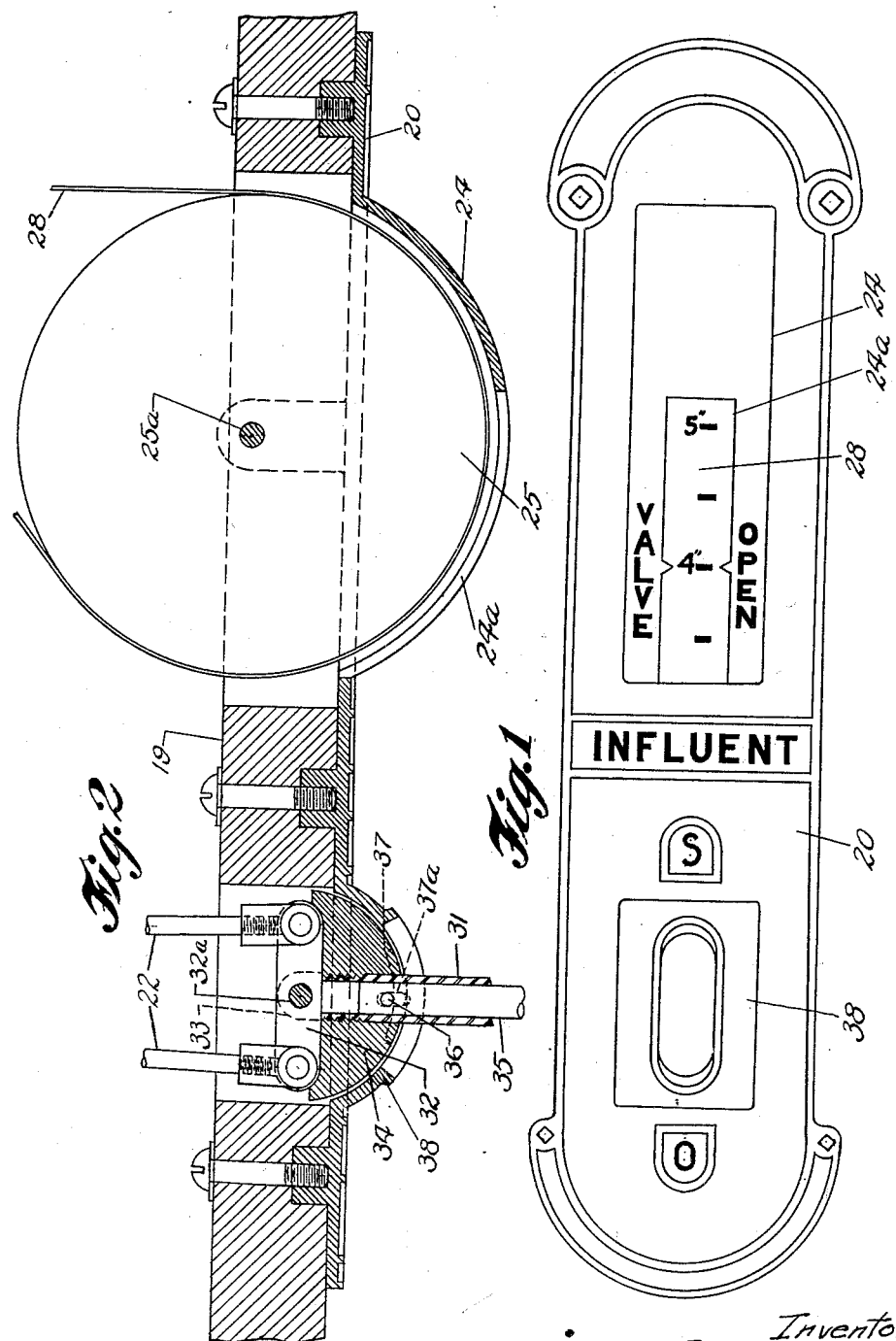

Jan. 5, 1932.   P. F. PEW   1,839,993
OPERATION INDICATOR
Filed Dec. 26, 1930   2 Sheets-Sheet 2
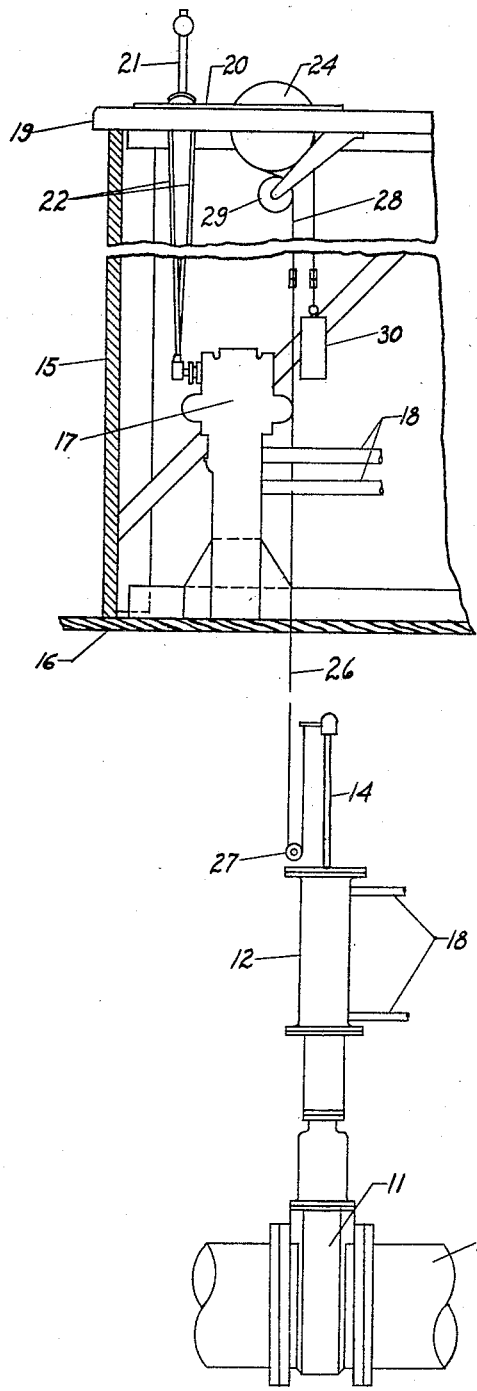

Patented Jan. 5, 1932

1,839,993

UNITED STATES PATENT OFFICE

PRESTON F. PEW, OF CHICAGO, ILLINOIS, ASSIGNOR TO GENERAL WATER PURIFICATION CORPORATION, OF CHICAGO, ILLINOIS, A CORPORATION OF ILLINOIS

OPERATION INDICATOR

Application filed December 26, 1930. Serial No. 504,783.

This invention relates to operation indicators or telltale devices and find particular utility in connection with the indicating of the positions of large valves which are operated by appropriate motive and control devices, although its usefulness is not limited to that particular type of apparatus.

A general object of the invention is the provision of an operation indicating device, or telltale device, of very simple design and construction, adapted for use at a control station for showing the positions and operating movements of a remotely located mechanism.

Another object is the provision of such a device which is very accurate and will show definitely the operative position or condition of the remotely located device at all times, throughout its entire range of operation.

Another object is to provide such a mechanism which will indicate definitely the rate of change or operative movement of the remotely located mechanism as well as the momentary operative position of the same.

Another object is the provision of an apparatus having the particular structural and functional features hereinafter described.

Other and further objects will be pointed out or indicated hereinafter or will be apparent to one skilled in the art upon an understanding of the invention or its employment in use.

For the purpose of aiding in explanation of the invention, I show in the accompanying drawings forming a part of this specification certain forms and arrangements of mechanism wherein the invention may be embodied and used, but it is to be understood that these are presented for purpose of illustration merely, and are not to be construed in any fashion calculated to limit the appended claims short of the true and most comprehensive scope of the invention in the art.

In said drawings,

Fig. 1 is a top plan view of a mounting plate adapted to constitute both a mounting for a control lever and a portion of the indicator apparatus;

Fig. 2 is a longitudinal sectional elevation of such plate showing portions of control lever and indicator mechanism in place thereon; and Fig. 3 is a diagram illustrating features of the indicator mechanism and its application to a valve mechanism.

For illustration of the invention I will describe it as applied to a valve operating and control mechanism. In most large sized filters of the gravity type, such as ordinarily used in municipal filtration plants, the valves which control the various flows of water into and away from the filter units are commonly situated in what is called a pipe gallery that is located adjacent the filter basin and usually at or about the same level as the bottom of the filter. The control house is usually located above the pipe gallery, at some distance from the valves. The valves controlling the operation of the filter may be of various sizes, and they usually range from about a 4 inch opening to a 24 inch opening, or larger. For convenience, these valves are ordinarily operated hydraulically, the valve stem being connected to a piston which is moved in a hydraulic cylinder by introduction of the hydraulic pressure medium on one side of the piston to close the valve and on the other side of the piston to open it. The introduction of the hydraulic pressure medium to the cylinder is ordinarily controlled by a control valve or valves, which may be moved to the desired operative positions by hand levers mounted on an operating table or board in the control house. There are usually four or five valves to be controlled for each filter unit, as for controlling the draw-off of filtered water, the supply of raw water, the supply of backwash water, etc., and it is important that the operator or control man be able to ascertain at any time the instant operative positions of the various valves.

As illustrated diagrammatically in Fig. 3, the reference numeral 10 designates one of the pipes or lines serving a filter unit, the reference numeral 11 designates the housing of a valve for controlling flow through said pipe, the reference numeral 12 designates the cylinder of the hydraulic valve operating mechanism, and the reference numeral 14 designates a tail rod which is connected to the hydraulic piston in the cylinder 12, which rod moves up and down through a packing gland in the cylinder head, so that its position corresponds at all times to the position of the piston, and hence to the position of the valve. The reference numeral 15 designates a housing portion of the controller table, which rests on the floor 16 and houses the control valve 17. This valve controls the admission of hydraulic pressure medium to the cylinder 12 by way of pipes 18. On the top 19 of the control table is mounted a plate or frame 20 which constitutes a mounting for the manually operable control lever 21 which is operatively connected with the movable parts of control valve 17 by means of the rods 22.

As seen in Fig. 2, this frame or mounting 20 affords an upstanding segmental housing portion 24 for a pulley or guide 25 which is rotatably supported on the mounting at 25$^a$. Said housing 24 has an opening 24$^a$ through a portion of its upper or cylindrical side over the periphery of the pulley or guide 25. The table top or supporting panel 19 is apertured to accommodate the passage therethrough of the movable indicator 28. This is in the form of a flat flexible strip or tape and has one end connected with the upper end of the tail rod 14 by means of a flexible cable or chain 26, which is guided around an idler roller 27 and attached to one end of the movable indicator by a suitable coupling. The movable indicator 28 is guided over an idler roller 29 and is of such length as to accommodate the full movement of the tail rod 14. The indicator strip 28 and the flexible connection 26 are held taut by a weight 30 attached to the free end of the strip, and thereby the strip is held in close surface contact with the periphery of the guide or pulley 25. Accordingly, as the tail rod 14 moves downwardly with the closing movement of the valve, the indicator strip 25 will be moved in one direction past the view aperture 24$^a$, and when the tail rod 14 rises with the opening movement of the valve, the indicator strip will be moved in the opposite direction. It will be observed that this movement of the indicator strip past the view aperture 24$^a$ is at the same rate and of the same extent as the movement of the tail rod 14 and of the valve to which it is attached. The indicator strip is provided with indicia which are moved past the aperture 24$^a$ upon movement of the strip. These indicia may be such as to indicate the position of the valve, such as in inches of opening, or in proportion of opening such as $1/4$, $1/2$, etc., and the housing 24 may be provided with appropriate markers to indicate the place at which the indicia are to be read as indicating the then operative position of the valve. It is desirable, however, that the aperture 24$^a$ be of such extent as to expose the indicator strip for some distance on both sides of the reading line, as by the inspection of the indicator strip thus afforded, the rate of movement of the valve may be ascertained.

The mounting 20 affords a support for the control valve operating lever in association with the aperture 24$^a$, so that the movement of the indicator may be observed during operation of the lever. As here illustrated, the lever comprises the tubular portion 31 which passes through an appropriate slot in the top of an upstanding embossment 38 on the mounting 20, and is screw-threaded in a semi-cylindrical block 34 which fits within the embossment. The control valve operating rods 22 are fastened to the ends of a yoke 32 which abuts the lower face of the block 34 and is mounted to swing, with said block, on a pintle 32$^a$ which is seated in the lugs 33 of the mounting 20. Consequently, when the control lever is swung longitudinally of the mounting 20, the rods 22 will be moved longitudinally to actuate the control valve 17. Within the tubular member 31 is a longitudinally shiftable rod 35 which is spring-pressed upwardly, and which carries a laterally extending pin 36 which extends through slots in opposite sides of the tubular member 31 and is adapted to seat in a notch 37$^a$ in the flanges 37 which are formed on the embossment 38 along the opposite sides of the lever slot. The rod 35 is spring-pressed upwardly and its upper end extends out the upper end of the lever, so that the rod may be depressed to unseat the pin 36 from the notches 37$^a$. These notches are located at the medial or neutral position of the lever, at which position the control valve 17 is maintained at the neutral or closed position so that no hydraulic pressure medium will be transmitted to the valve cylinder 12. In similar fashion, the lever may be latched in the limit positions of its movement for effecting opening and closing operation of the valve. Upon disengagement of the pin 36 from the notches 37$^a$, the control lever may be swung on the pivot 32$^a$, in one direction from the neutral position to operate the control valve 17 to introduce hydraulic pressure medium at one side of the valve motor piston, and in the other direction to operate the control valve to introduce hydraulic pressure medium on the other side of the valve motor piston. The directions of movement of the control lever to effect these operations of the control valve are preferably in correspondence with the directions of movement of the indicator strip. That is, the direction of movement of the lever to produce closing movement of the valve 11 is in the same direction as the indicator moves upon closing movement of said valve, and vice versa. The directions of movement of the control lever are indicated in Fig. 1 by S to indicate shutting movement of the valve, and by O to indicate opening movement of the valve.

From the foregoing, it will be apparent how the operator is kept continuously informed both as to the instant operative position of the valve and also as to the rate at which its operative position is being changed. It is also to be observed that the device is very simple in construction and operation. Adjustments as between the indicator strip and the flexible connection 26 may be provided for, for the purpose of properly adjusting the zero point of the indicator with respect to the reading line and the tail rod, by having the coupling of a suitable turnbuckle or other appropriate nature. By making the indicator strip and the periphery of the guide pulley 25 of translucent material, the reading area may be illuminated from an electric lamp positioned within the guide 25. Although friction is eliminated by having the guide 25 revolve, such is not essential, as the indicator strip may slide over the guide, such relative slippage between the guide and the indicator strip having no effect on the accuracy of the reading in any instance.

One advantage of the construction resides in the fact that the mounting may be made very narrow, as in the forms herein shown, without detracting from the readability of the indicator. This feature permits the placing of the control levers for different valves close together on the control table, so that all are within easy reach of the operator.

What I claim is:

1. Operation indicating mechanism comprising, in combination, a member movable with the operated instrumentality, an indicator guide, an indicator strip supported on the guide for longitudinal movement, an operative connection between said strip and said member whereby the strip is moved longitudinally in accordance with movement of said member, said strip being provided with legible indicia distributed longitudinally thereof, and an index associated with said strip in position for observation adjacent the indicia.

2. In operation indicating mechanism, the combination with a member movable with the operated instrumentality, of a mounting, a rotary guide supported on the mounting, an indicator strip supported on the guide for longitudinal movement, an operative connection between said indicator strip and said member whereby the position of the latter determines the longitudinal position of the strip, said strip being provided with indicia distributed longitudinally thereof, and an index disposed adjacent the guide for observation in association with the indicia.

3. Operation indicating mechanism comprising, in combination with a member movable in accordance with movement of the operated instrumentality, a mounting, a rotatable guide thereon, an indicator strip supported on the guide for longitudinal movement, an operative connection between said indicator strip and said member whereby the longitudinal position of the strip is determined by the position of said member, and a housing on the mounting covering a portion of the indicator strip, the indicator strip being provided with indicia distributed longitudinally thereof, said housing affording an opening through which a plurality of said indicia may be observed simultaneously.

4. The combination with a movable valve and valve operating means, of a guide disposed a distance from the valve, an indicator strip supported on the guide for longitudinal movement, an operative connection between the valve and the strip whereby the latter is moved longitudinally in accordance with movements of the valve, said strip being provided with legible indicia distributed longitudinally thereof, and an index associated with the indicator strip and past which the said indicia are moved incident to longitudinal movement of the strip.

5. The combination with a movable valve and means for operating same, of a mounting disposed a distance from the valve, a guide carried on said mounting, an indicator strip supported on the guide for longitudinal movement, a connection between said strip and the valve whereby the strip is moved longitudinally in accordance with movements of the valve, said strip having legible indicia distributed longitudinally thereof, a control lever operably mounted on said mounting adjacent the guide, and operative connection between said lever and said valve operating means.

6. Apparatus of the sort described comprising a mounting, a rotary guide supported thereon, an indicator strip supported on said guide for longitudinal movement, said strip being provided with legible indicia distributed longitudinally thereof, a control lever movably supported on said mounting, and means controlled by said lever for determining the longitudinal position of said indicator strip.

7. Mechanism as specified in claim 4 and wherein the extent of movement of the indicator strip is in all instances the same as the extent of movement of the valve.

8. Mechanism as specified in claim 4 and wherein the speed of movement of the indicator strip is the same as that of the valve.

9. A valve operation indicator comprising, in combination, a guide, a flexible member having connection at one end with the valve and at the other with a weight, and a guide supporting a portion of said flexible member for longitudinal movement, said flexible member having a broadened and graduated portion for movement on the guide.

10. Mechanism as specified in claim 4, wherein the indicator strip is composed of a translucent material, and including illuminating means behind said indicator strip.

In testimony whereof I have hereunto subscribed my name.

PRESTON F. PEW.